Patented Dec. 6, 1927.

1,652,101

UNITED STATES PATENT OFFICE.

HAROLD WALTER ELLEY, OF WILMINGTON, DELAWARE, ASSIGNOR TO E. I. DU PONT DE NEMOURS & COMPANY, OF WILMINGTON, DELAWARE, A CORPORATION OF DELAWARE.

VULCANIZED RUBBER AND PRODUCTION THEREOF.

No Drawing. Application filed December 2, 1926. Serial No. 152,303.

This invention relates to the vulcanization of rubber and the products obtained thereby. More particularly, it is directed to a process for vulcanizing rubber in the presence of an organic accelerator, and the products obtained by such process.

This case is a continuation in part of my copending application Serial No. 11,590, filed February 25, 1925.

It has been known for some time that certain organic compounds, including certain thiuram mono- and di-sulfides are accelerators of vulcanization at milling temperatures, but their use for this purpose has been greatly restricted because many rubber stocks containing such accelerators can not be conveniently handled without excessive scorching.

It is one of the objects of the present invention to provide accelerators for use in the vulcanization processes which have a great accelerating power throughout a remarkably wide range of curing temperatures. It is a further object to provide accelerators which have no, or only slight tendencies to scorch during milling. Other objects will be apparent from the description.

The present invention consists in the process of vulcanizing rubber which has been mixed, prior to vulcanization, with a vulcanizing agent and a cyclic thiuram sulfide having the following structural formula:

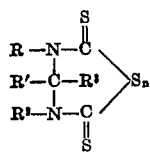

where R and $R^2$ stand for hydrocarbon radicals, R' and $R^3$ stand for hydrogen or hydrocarbon radicals, and "n" stands for the number of sulfur atoms.

The new accelerators, for convenience, may be divided into two sub-classes, depending upon whether "n" equals 2 or 1.

Where "n" equals 2 the accelerator is the disulfide and this sub-class includes methylene-thiuram-disulfide and its homologues and derivatives, all of which probably contain the following atomic grouping:

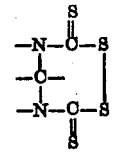

These compounds are readily obtainable from the corresponding sodium dithionates by oxidation in accordance with the following equation:

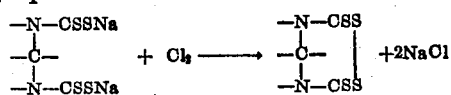

Valuable accelerators of this sub-class are the alkylidene-dialkyl (or diaryl)-thiuramdisulfides having the following general graphical formula:

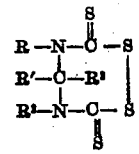

where R and $R^2$ stand for hydrocarbon radicals and R' and $R^3$ stand for hydrogen or hydrocarbon radicals.

Examples of accelerators of this sub-class are:

Methylene - dimethyl - thiuram - disulfide, ethylidene-dibenzyl-thiuram-disulfide, ethylidene-dimethyl-thiuram-disulfide, butylidenediethyl-thiuram-disulfide, butylidene-dimethyl-thiuram-disulfide.

As a specific example, methylene-dimethyl-thiuram-disulfide may be used. This material may be prepared as follows:

An aqueous solution of methylamine is mixed with a molecular equivalent of sodium hydroxide as a 30% solution and is then treated with an excess of carbon disulfide. The mixture is well cooled and agitated during the addition of the carbon disulfide. After standing for three hours the sodium salt of methyl dithio-carbamic acid is filtered off. A molecular quantity of the sodium methyl dithio carbamate is dissolved in water and an equivalent quantity of formaldehyde is added. Zinc sulfate is then added to precipitate the zinc salt of the aldehyde condensation product. This suspension is treated with sufficient bromine dissolved in alcohol to form the disulfide and thus close the ring. The flocculent white precipitate is filtered off and dried.

Where "n" equals 1 the accelerator is the monosulfide and includes methylene-thiuram-mono-sulfide and its homologues and derivatives, the molecules of which probably contain in common the following atomic grouping:

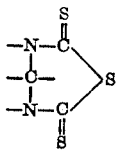

Valuable accelerators of this sub-class are believed to have the following general formula:

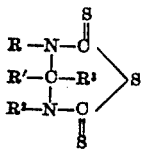

where R and R² stand for hydrocarbon radicals, and R' and R³ stand for hydrogen or hydrocarbon radicals.

These monosulfides may be obtained from the corresponding disulfides, such as those described, by treating the disulfide with an alcoholic solution of potassium cyanide, the reaction apparently proceeding in accordance with the following equation:

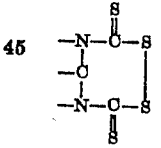

Accelerators of this group which are particularly valuable are the alkylidene-dialkyl- or diaryl-thiuram-monosulfides having most probably the general graphical formula already pointed out.

Specific examples of accelerators of this group are:

Propylidene-diethyl-thiuram-monosulfide, methylene-dimethyl-thiuram-monosulfide, butylidene-dimethyl-thiuram-monosulfide, ethylidene-dibenzyl-thiuram-monosulfide, methylene-diphenyl-thiuram-monosulfide.

In using the above described accelerators, combined zinc, preferably in the form of zinc oxide, is advantageously incorporated in the rubber mix along with sulfur and the accelerator. A typical cure may be illustrated by the following example:

|   | Parts. |
|---|---|
| Smoked sheet | 50 |
| Amber crêpe | 50 |
| Zinc oxide | 6 |
| Sulfur | 6 |
| Accelerator | 0.75 to 1.2 |

The mixture after milling in the usual manner is placed in a mold and heated with steam at 20 pounds pressure (about 125° C.) for 20 minutes, when vulcanization is completed. The vulcanized product has a tensile strength of 4,065 pounds, and an elongation of 700%.

In general, the vulcanized rubber obtained by the present process possesses remarkably high tensile strength, resistance to tear, elasticity, and good ageing qualities. My accelerators do not discolor the stock, do not give an offensive odor to the rubber, and do not give off poisonous fumes during the milling operation. While my accelerators are able to effect vulcanization at temperatures above 100° C., they, nevertheless cause practically no scorching as a result of milling. Moreover, these new accelerators not only give efficient cures at a temperature as low as that corresponding to five pounds steam pressure, but also show excellent accelerating power at the usual vulcanization temperatures, that is, corresponding to forty pounds steam pressure. The great accelerating power of my accelerator throughout a remarkably wide range of curing temperatures and pressures, and the exceedingly slight tendency to scorch during milling renders these accelerators of great importance commercially.

Although in the above description the invention has been illustrated by specific examples mentioning certain specific accelerators, it will be understood that my invention is not in any way limited to these specific examples, but includes broadly, cyclic thiuram sulfides having the generic formulas given above and containing in place of the specific alkylidene, aryl, and alkyl radicals, hereinbefore mentioned, various other analogous radicals.

Any desired changes or variations may be made without departing from the spirit of the invention.

I claim:

1. A process of vulcanizing rubber which comprises mixing with the rubber a vulcanizing agent and a cyclic thiuram sulfide, and subjecting the mixture to a vulcanizing temperature.

2. A process of vulcanizing rubber which comprises mixing with the rubber a vulcanizing agent and a cyclic alkylidene thiuram sulfide, and subjecting the mixture to a vulcanizing temperature.

3. A process of vulcanizing rubber which comprises mixing with the rubber a vulcanizing agent and a cyclic alkylidene thiuram disulfide, and subjecting the mixture to a vulcanizing temperature.

4. A process of vulcanizing rubber which comprises mixing with the rubber a vulcanizing agent and a cyclic alkylidene dialkyl thiuram sulfide, and subjecting the mixture to a vulcanizing temperature.

5. A process of vulcanizing rubber which comprises mixing with the rubber a vulcanizing agent and a cyclic methylene thiuram sulfide, and subjecting the mixture to a vulcanizing temperature.

6. A process of vulcanizing rubber which comprises mixing with the rubber a vulcanizing agent and a cyclic methylene dialkyl thiuram sulfide, and subjecting the mixture to a vulcanizing temperature.

7. A process of vulcanizing rubber which comprises mixing with the rubber a vulcanizing agent and a cyclic methylene dialkyl thiuram disulfide, and subjecting the mixture to a vulcanizing temperature.

8. A process of vulcanizing rubber which comprises mixing with the rubber a vulcanizing agent and a methylene dimethyl thiuram sulfide, and subjecting the mixture to a vulcanizing temperature.

9. A process of vulcanizing rubber which comprises mixing with the rubber a vulcanizing agent and a methylene dimethyl thiuram disulfide, and subjecting the mixture to a vulcanizing temperature.

10. A process of vulcanizing rubber which comprises mixing with the rubber a vulcanizing agent and an accelerator having a molecular structure indicated by the following general formula:

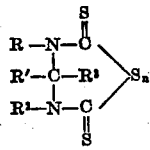

where R and R² stand for hydrocarbon radicals, R' and R³ stand for hydrogen or hydrocarbon radicals, and "n" stands for the number of sulfur atoms; and subjecting the resulting mixture to a vulcanizing temperature.

11. A process of vulcanizing rubber which comprises mixing with the rubber a vulcanizing agent and an accelerator having a molecular structure indicated by the following general formula:

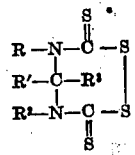

where R and R² stand for hydrocarbon radicals and R' and R³ stand for hydrogen or hydrocarbon radicals; and subjecting the resulting mixture to a vulcanizing temperature.

12. A process of vulcanizing rubber which comprises mixing with the rubber a vulcanizing agent, combined zinc and a cyclic thiuram sulfide, and subjecting the mixture to a vulcanizing temperature.

13. A process of vulcanizing rubber which comprises mixing with the rubber a vulcanizing agent, combined zinc and methylene dimethyl thiuram disulfide, and subjecting the mixture to a vulcanizing temperature.

14. A process of vulcanizing rubber which comprises mixing with the rubber a vulcanizing agent, combined zinc and an accelerator having a molecular structure indicated by the following general formula:

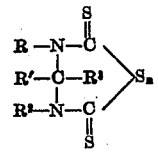

where R and R² stand for hydrocarbon radicals, R' and R³ stand for hydrogen or hydrocarbon radicals, and "n" stands for the number of sulfur atoms; and subjecting the resulting mixture to a vulcanizing temperature.

15. A process of vulcanizing rubber which comprises mixing with the rubber a vulcanizing agent, combined zinc and an accelerator having a molecular structure indicated by the following general formula:

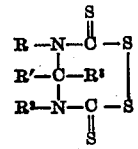

where R and R² stand for hydrocarbon radicals and R' and R³ stand for hydrogen or hydrocarbon radicals; and subjecting the resulting mixture to a vulcanizing temperature.

16. A vulcanized rubber obtainable by the process defined in claim 1.

17. A vulcanized rubber obtainable by the process defined in claim 3.

18. A vulcanized rubber obtainable by the process defined in claim 9.

19. A vulcanized rubber obtainable by the process defined in claim 10.

20. A vulcanized rubber obtainable by the process defined in claim 11.

21. A vulcanized rubber obtainable by the process defined in claim 14.

22. A vulcanized rubber obtainable by the process defined in claim 15.

In testimony whereof I affix my signature.

HAROLD W. ELLEY.